UNITED STATES PATENT OFFICE.

WILLIS H. POST, OF BATTLE CREEK, MICHIGAN, ASSIGNOR TO POSTUM CEREAL COMPANY, OF BATTLE CREEK, MICHIGAN, A CORPORATION OF MICHIGAN.

FLAKED CEREAL FOOD PRODUCT AND METHOD OF MAKING THE SAME.

1,286,766.   Specification of Letters Patent.   Patented Dec. 3, 1918.

No Drawing.   Application filed April 6, 1917. Serial No. 160,317.

*To all whom it may concern:*

Be it known that I, WILLIS H. POST, a citizen of the United States of America, and a resident of Battle Creek, Michigan, have invented a new and useful Improvement in Flaked Cereal Food Products and Methods of Making the Same, which invention is fully set forth in the following specification.

The present invention relates to improvements in toasted cereal products, such as corn or rice flakes, and in the methods of making the same, and has for its object to provide such toasted flake products, fully cooked, with a coating of bran, whereby the mineral salts, laxative and scouring properties of the bran may be imparted to the product while retaining the palatability and the normal form of the toasted flakes.

Toasted cereal flakes, such as toasted corn or rice flakes, as heretofore prepared, usually contain only the starchy constituents of the grain from which they are made, the laxative properties and the mineral salts desirable in a balanced cereal product being absent. With a view of overcoming this objection and providing an attractive, palatable and ready cooked food product which shall possess the above-named properties, and contain the valuable mineral salts of proper kind and in proper proportions, I provide the cooked cereal flakes, such as corn or rice flakes, with a coating of bran, preferably bran derived from a cereal other than that from which the flakes are made. Thus, in the case of corn or rice flakes, I preferably employ wheat bran.

In the practice of my invention, I may proceed as follows:

Assuming that toasted bran-coated corn flakes are to be made, I place in a cooker, preferably a rotary steam cooker, a quantity of corn grits to which I may, and preferably do, add a sweetening agent, such as cane or beet sugar, and a small quantity of salt, or, if desired, the sweetening agent and salt may be omitted. The cereal is then subjected for about one and one-half to two hours to a cooking temperature in the presence of moisture, until the grits are partially cooked. Bran, preferably wheat bran, is then mixed with the grits and the heat is continued to complete the cooking, without destroying the identity of the grains. This has the advantage of blending the flavors of the corn grits and the bran. From the cooker the commingled cooked corn grits and bran are transferred to a suitable drier in which a part of the moisture is removed, after which the same is transferred to tubs or bins wherein they are permitted to remain for about 6 hours to toughen the grains. The toughened grains, together with the bran mixed therewith, are now passed through flaking rolls, whereby the grains are formed into flakes and the bran is simultaneously rolled into the surface of the flakes, forming a coating thereon. The adhesion of the bran to the flakes is assisted by the saccharine body used for sweetening (when such is employed), and by the starch of the grain. The flakes with the adhering bran coating then have a suitable binder applied thereto in any suitable way to avoid destruction of the integrity of the cooked flakes. Preferably I spray a thin solution of cane or beet sugar over the flakes, thereby providing them with a coating of the binder, and then apply the bran to the flakes while the latter are passing through the air or other atmosphere. This causes an additional coating of bran to adhere to the flakes. Any excess of bran not adhering thereto is mechanically removed, after which the cooked bran-coated flakes are subjected to a drying operation to remove a part of their moisture, and then toasted. The bran cooked in the steam cooker with the grains is sterilized by this cooking operation, and the coat of bran added after the flakes are rolled is effectually sterilized by the toasting operation.

The binder employed to cause the bran to adhere to the flakes may be selected to give the product a sweet taste, and in such case I have found that a thin saccharine syrup made from cane or beet sugar gives excellent results, though it is obvious that other saccharine substances, such as dextrin, infusion of malt, partly converted starch or other like bodies, either alone or mixed, may be employed. The degree of sweetness of the product may be varied by replacing the cane or beet sugar, in whole or in part, by one or more of the less sweet saccharine bodies named above, or by gelatinized starch or other edible substances which will act as a binder.

Where a lighter coating of bran on the finished flakes is desired, I may, and sometimes do, cook the grains without the presence of bran, dry and toughen the same, as described above, pass the toughened grains through the flaking rolls, after which the binder is applied to cause the bran coating to adhere thereto. Or I may cook the bran with the grain, dry and toughen the same, and pass the grain and the bran through the rollers to produce flakes with the bran coating embedded therein, and then toast the flakes without the addition of the second bran coating described above.

By my process I am enabled to produce a ready cooked palatable food product in the form of a cereal flake coated with any desired or proper amount of thoroughly sterilized bran, such flakes possessing not only the nutritive properties of the cereal, but also the laxative properties and mineral salts of the bran.

What I claim is:—

1. A food product consisting of toasted flakes of one kind of cereal having bran of another kind of cereal embedded in their surfaces and additional bran secured to their surfaces by a binding agent.

2. A food product consisting of toasted corn flakes having bran embedded in their surfaces, and additional bran secured to their surfaces by a binding agent.

3. A food product consisting of toasted corn flakes having wheat bran embedded in their surfaces and additional bran secured to their surfaces by a binding agent.

4. A food product consisting of toasted cereal flakes having bran secured thereto by a saccharine binding agent.

5. A food product consisting of toasted corn flakes having bran secured thereto by a binding agent.

6. A food product consisting of toasted corn flakes having bran secured thereto by a saccharine binding agent.

7. A food product consisting of toasted corn flakes having wheat bran secured thereto by a binding agent.

8. A food product consisting of toasted corn flakes having wheat bran secured thereto by a saccharine binding agent.

9. A food product consisting of toasted corn flakes having bran of another cereal embedded in their surfaces.

10. A food product consisting of toasted corn flakes having wheat bran embedded in their surfaces.

11. A food product consisting of toasted cereal flakes having bran of another cereal secured thereto by a saccharine binding agent.

12. A non-roasted corn flake having wheat bran secured thereto.

13. A process of making toasted bran-coated cereal flakes consisting in cooking a cereal with bran, subjecting the cooked cereal to a flaking operation thereby embedding the bran in the surfaces of the flakes, securing additional bran to the flakes by a binder and toasting the product.

14. A process of making toasted bran-coated cereal flakes consisting in cooking a cereal with bran, rolling the cooked flakes and bran to flake the cereal and embed the bran in the surfaces of the flakes, moistening the flakes with a binder without destroying the identity of the flakes, applying additional bran to the flakes, drying and toasting the product.

15. A process of making toasted bran-coated cereal flakes consisting in cooking a cereal with bran, subjecting the cooked cereal and bran to a flaking operation thereby embedding the bran in the surfaces of the flakes, spraying the flakes with a binder without destroying the identity of the flakes, applying bran thereto and toasting the product.

16. A process of making toasted bran-coated flakes consisting in cooking corn grits with wheat bran, subjecting the cooked grits and bran to a flaking operation thereby embedding the bran in the surfaces of the flakes, securing additional bran to the flakes by means of a binder and toasting the product.

17. A process of making toasted bran-coated flakes, consisting in cooking corn grits with wheat bran, subjecting the cooked grits and bran to a flaking operation thereby embedding the bran in the surfaces of the flakes, spraying the flakes with a saccharine solution without destroying the identity of the flakes, applying additional bran to said flakes and toasting the bran-coated flakes.

18. The process of making toasted bran-coated cereal flakes, consisting in cooking cereal grits or granules with bran of another cereal, subjecting the cooked product to a flaking operation thereby embedding the bran in the surfaces of the flakes and toasting the bran-coated flakes.

19. A process of making toasted bran-coated cereal flakes, consisting in moistening cooked cereal flakes with a binder without destroying the identity of the flakes, applying bran to the flakes and toasting the product.

20. A process of making toasted bran-coated cereal flakes, consisting in spraying a binder on cooked cereal flakes, applying bran to the flakes and toasting the product.

21. A process of making toasted bran-coated cereal flakes consisting in flaking a cooked cereal in the presence of wheat bran, causing additional bran to adhere to said flakes by means of a binding agent, and toasting the flakes.

22. A process of making toasted bran-coated cereal flakes consisting in moistening the surfaces of a flaked cereal with a binding material, applying bran thereto to form a bran coating, then drying and toasting the product.

23. A process of making toasted bran-coated corn flakes consisting in forming flakes of corn and then applying bran to the flakes in the presence of a binding material to form a bran coating, then drying and toasting the product.

24. A process of making toasted bran-coated corn flakes consisting in spraying flaked corn with a saccharine solution to moisten the surface of the flakes, then applying bran of a different cereal to coat the same, drying and toasting the product.

25. A process of making toasted bran-coated cereal flakes consisting in cooking a cereal with bran and a saccharine body, flaking and toasting the product.

26. A process of making toasted bran-coated cereal flakes consisting in cooking a cereal with bran, flaking the product, causing additional bran to adhere to the flakes by aid of a binder, and toasting the product.

In testimony whereof I have signed this specification.

WILLIS H. POST.